(12) United States Patent
Bae et al.

(10) Patent No.: US 8,994,304 B2
(45) Date of Patent: Mar. 31, 2015

(54) METHOD FOR CONTROLLING INTERIOR PERMANENT MAGNET SYNCHRONOUS MOTOR

(71) Applicants: Hyundai Motor Company, Seoul (KR); Kia Motors Corporation, Seoul (KR); Industry-Academic Cooperation Foundation, Yeungnam University, Gyeongsan, Gyeongbuk (KR)

(72) Inventors: Su Hyun Bae, Gyeonggi-do (KR); Sung Kyu Kim, Gyeonggi-do (KR); Won Kyoung Choi, Gyeonggi-do (KR); Mu Shin Kwak, Gyeonggi-do (KR); Jul Ki Seok, Daegu (KR); Se Hwan Kim, Daegu (KR)

(73) Assignees: Hyundai Motor Company, Seoul (KR); Kia Motors Corporation, Seoul (KR); Industry-Academic Cooperation Foundation, Yeungnam University, Gyeongsan, Gyeongbuk (KR)

( * ) Notice: Subject to any disclaimer, the term of this patent is extended or adjusted under 35 U.S.C. 154(b) by 232 days.

(21) Appl. No.: 13/653,543

(22) Filed: Oct. 17, 2012

(65) Prior Publication Data

US 2013/0328508 A1     Dec. 12, 2013

(30) Foreign Application Priority Data

Jun. 12, 2012   (KR) .......................... 10-2012-0062625

(51) Int. Cl.
*H02P 21/00*     (2006.01)

(52) U.S. Cl.
CPC ........ *H02P 21/0085* (2013.01); *H02P 21/0089* (2013.01)
USPC ............ 318/400.02; 307/151; 363/9; 363/10; 363/21.01; 363/21.11; 363/21.18; 318/433; 318/700; 318/400.01

(58) Field of Classification Search
CPC ....... H02P 21/06; H02P 21/0035; H02P 6/08; H02P 21/0089; H02P 21/00; H02P 1/46; H02P 21/08; H02P 6/10; H02P 6/16; H02P 21/0085; H02P 21/02; B60L 15/025; B60L 2220/14; B60L 2220/16; B60L 2220/18; B60L 2240/423; B60L 2260/167; B60L 3/0061; B60L 9/22; B60L 11/1803; B60L 11/1814; B60L 7/10; B60W 10/08; B60W 20/00; B60W 30/18; B60W 30/18127
USPC ............ 318/400.02, 376, 432, 538, 716, 433, 318/700, 400.01; 180/65.31, 156.01, 180/156.07, 156.36; 903/903; 363/9, 10, 363/21.01, 21.1, 21.11, 21.18
See application file for complete search history.

(56) References Cited

U.S. PATENT DOCUMENTS 5,365,153 A * 11/1994 Fujita et al. ...................... 318/34
5,652,495 A *  7/1997 Narazaki et al. ............... 318/716

(Continued)

FOREIGN PATENT DOCUMENTS

| KR | 10-0634588 | 7/2005 |
|---|---|---|
| KR | 10-0655702 | 6/2006 |
| KR | 10-2011-0109433 | 10/2011 |

*Primary Examiner* — Rita Leykin
(74) *Attorney, Agent, or Firm* — Mintz Levin Cohn Ferris Glovsky and Popeo, P.C.; Peter F. Corless

(57) ABSTRACT

Disclosed is a method for controlling a permanent magnet synchronous motor to maximize use of voltages of a battery by voltage phase control within weak magnetic flux area and to achieve compensation for a torque error through a torque compensator when driving the permanent magnet synchronous motor for hybrid vehicles. In particular, the method controls a permanent magnet synchronous motor so that voltage use can be maximized in a weak magnetic flux area by using voltage near maximum voltage through voltage phase control utilizing magnetic flux-based map data receiving a torque command and motor speed/batter output voltage as inputs and torque error can be compensated using a torque compensation filter when a motor constant is changed in the weak magnetic flux by a circumstance parameter, when the permanent magnet synchronous motor mounted in a hybrid vehicle and an electric vehicle is driven.

8 Claims, 7 Drawing Sheets

(56) References Cited

U.S. PATENT DOCUMENTS

| | | | |
|---|---|---|---|
| 6,605,912 B1 * | 8/2003 | Bharadwaj et al. | 318/400.09 |
| 6,806,676 B2 | 10/2004 | Papiernik et al. | |
| 7,262,536 B2 * | 8/2007 | Rahman et al. | 310/156.35 |
| 2008/0030155 A1 * | 2/2008 | Patel et al. | 318/400.02 |
| 2009/0295316 A1 * | 12/2009 | Patel et al. | 318/400.02 |

* cited by examiner

METHOD FOR CONTROLLING INTERIOR PERMANENT MAGNET SYNCHRONOUS MOTOR

CROSS-REFERENCE TO RELATED APPLICATION

This application claims under 35 U.S.C. §119(a) the benefit of Korean Patent Application No. 10-2012-0062625 filed Jun. 12, 2012, the entire contents of which are incorporated herein by reference.

BACKGROUND

1. Field of the Invention

The present invention relates to a system and method of controlling a permanent magnet synchronous motor, and more particularly to a system and method of controlling a permanent magnet synchronous motor to maximize use of voltage created by a battery via voltage phase control within a weak magnetic flux area and to achieve compensation for a torque error through a torque compensator when driving the permanent magnet synchronous motor for a hybrid vehicle.

2. Description of the Related Art

In general, an interior permanent magnet synchronous motor (IPMSM) is a type of synchronous motor in which a permanent magnet inside the rotor core. IPMSMs are often used for industrial purposes or in hybrid electric vehicles due to their excellent high speed durability and high speed drivability.

FIG. 6 for example shows a block diagram illustrating an existing control method for an IPMSM. A control device for a PMSM 10 provides a final magnetic flux-axis (D-axis) command voltage $Vds^{r*}$ and a final rotational force-axis (Q-axis) command voltage $Vqs^{r*}$ to a PWM inverter and includes a current command generator 12, a current controller 14 for controlling current, a light modulator (not shown), and a feedback controller 16.

The current command generator 12 generates a magnetic flux-axis (D-axis) command current $ids^{r*}$ and a rotational force-axis (Q-axis) command current $iqs^{r*}$ based on the maximum magnetic flux $|\lambda|max$ of the results of controlling the command rotational force Te* and the weak magnetic flux.

The current controller 14 generates a primary magnetic flux-axis (D-axis) command voltage ($Vds^{r*}$) and a primary rotational force-axis (Q-axis) command voltage ($Vqs^{r*}$) based on the magnetic flux-axis (D-axis) command current ($ids^{r*}$) and a rotational force-axis (Q-axis) command current ($iqs^{r*}$) from the current command generator 12.

Moreover, the feedback controller 16 performs a PI current control-based weak magnetic flux control in order to control the magnetic flux in the permanent magnet synchronous motor 10 and generates a maximum magnetic flux deduction proportional to the D-axis command voltage $Vds^{r*}$ and the Q-axis command voltage $Vqs^{r*}$. In this case, when the D-axis command voltage $Vds^{r*}$ and the Q-axis command voltage $Vqs^{r*}$ are fed back from the current controller 14, a square average generator 16a of the feedback controller 16 outputs an output value as expressed by equation 1.

$$\sqrt{v_{ds}^{r*2} + v_{qs}^{r*2}} \quad \text{[Equation 1]}$$

The output value as expressed by equation 1 is subtracted from the maximum combined voltage $$v_{s,max} = \frac{V_{dc}}{\sqrt{3}}$$

by a subtractor 16b of the feedback controller 16 wherein Vdc is a direct current link voltage applied to the PWM inverter 18, and the feedback controller 16 outputs the subtracted output voltage as a rotor angular velocity $\Delta i_{ds}^{r*}$ of the permanent magnet synchronous motor.

FIG. 7 shows maximum use of voltage during the PI current control-based weak magnetic flux control of the permanent magnet synchronous motor. More specifically, reference numerals V1 to V6 indicate voltages represented by a vector sum of the D-axis applied voltage $Vds^{r*}$ and the Q-axis applied voltage $Vqs^{r*}$, the area of a circle inscribed in a hexagonal area indicates an area in which linear voltage synthesis is enabled, and $$v_{s,max} = \frac{V_{dc}}{\sqrt{3}}$$

indicates a maximum linearly synthesized voltage available within the circular area. Moreover, the hexagonal area indicates an area in which voltage synthesis is available by a spatial vector pulse width modulation (PWM) and a hatched area excluding a circular area inside the hexagonal area indicates a non-linear voltage modulation area.

In an existing permanent magnet synchronous motor, when a voltage is generated and a torque control is performed within the voltage limiting circle (the circular area) as the linear voltage area, that is, the maximum synthesized voltage $$v_{s,max} = \frac{V_{dc}}{\sqrt{3}}$$

where the linear voltage synthesis is enabled for the purpose of stable current control, there are several problems when as follows.

First, since voltages in the area inside the circle inscribed in the hexagon, as illustrated in FIG. 2, are used as a weak magnetic flux reference voltage, the voltage use decreases by about 10% than when voltages in the hexagonal area are used. Second, since the inverter cannot generate a precise voltage when the maximum synthesized voltage is greater than the maximum voltage $$v_{s,max} = \frac{V_{dc}}{\sqrt{3}}$$

in the voltage limiting circle (the area inside the circle) and deviates from the inscribed circle of the hexagon (the circular area) during the voltage modulation, the linearity of the output voltage (the maximum synthesized voltage) is broken and unstable torque control arises. Thus, it is difficult to control a synchronous motor stably while operating the motor at high speeds.

SUMMARY OF THE INVENTION

Accordingly, the present invention has been made to solve the above-mentioned problems occurring in the prior art, and the present invention provides a system and method of controlling a permanent magnet synchronous motor so that voltage use can be maximized in a weak magnetic flux area by using voltage in the vicinity of the maximum voltage through a voltage phase control utilizing magnetic flux-based map data receiving a torque command and a motor speed/battery output voltage as inputs. Furthermore, a torque error can be compensated for using a torque compensation filter when a motor constant is changed in the weak magnetic flux by a circumstance parameter, when the permanent magnet synchronous motor mounted in a hybrid vehicle and an electric vehicle is driven.

In accordance with an aspect of the present invention, there is provided a system and method of controlling a permanent magnet synchronous motor to use a command voltage ($v^*_{dq\_MVSC}$) outputted from an modulating voltage scale controller (MVSC) control mode in a motor torque control in a weak magnetic flux area comprising. More specifically, a current command ($I^*_{dq}$) is generated using a magnetic flux-based map data unit having a torque command ($T^*_e$) and a motor speed/battery output voltage $$\left(\frac{\sqrt{3}\,\omega_r}{V_{dc}}\right)$$

as inputs. A Current Vector Control mode is switched to as a current control mode in a constant torque area of a synchronous motor or the MVSC control mode is switched to as a voltage phase control mode in the weak magnetic flux area of the synchronous motor.

Preferably, the system and method further includes receiving, by a torque error compensation filter, a current output from an IPMSM and a voltage output from a voltage generator to output a torque error compensation voltage; and adding the torque compensation voltage to a voltage outputted from an inverse model map such that a torque error by the inverse model map is compensated in the form of a voltage, as illustrated in the following equation:

$$\Delta \hat{v}_{d\_D} \cong -\omega_r \Delta \hat{L}_q I_q$$

$$\Delta \hat{v}_{d\_D} \cong \omega_r (\Delta \hat{L}_q i_q + \Delta \hat{\lambda}_{pm})$$

wherein $\Delta \hat{L}_{dq}$ is a d-q axis inductance change, $\Delta \hat{\lambda}_{pm}$ is linkage flux change, and $\omega_r$ is a rotor angular velocity, and ^ is a variable.

Advantageously, the maximum voltage can be used even in the weak magnetic flux of the synchronous motor, copper loss of a motor can be reduced, resulting in improved fuel ratios and maximum outputs of a hybrid vehicle and an electric vehicle even in a weak magnetic flux of the synchronous motor.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Figure 1:
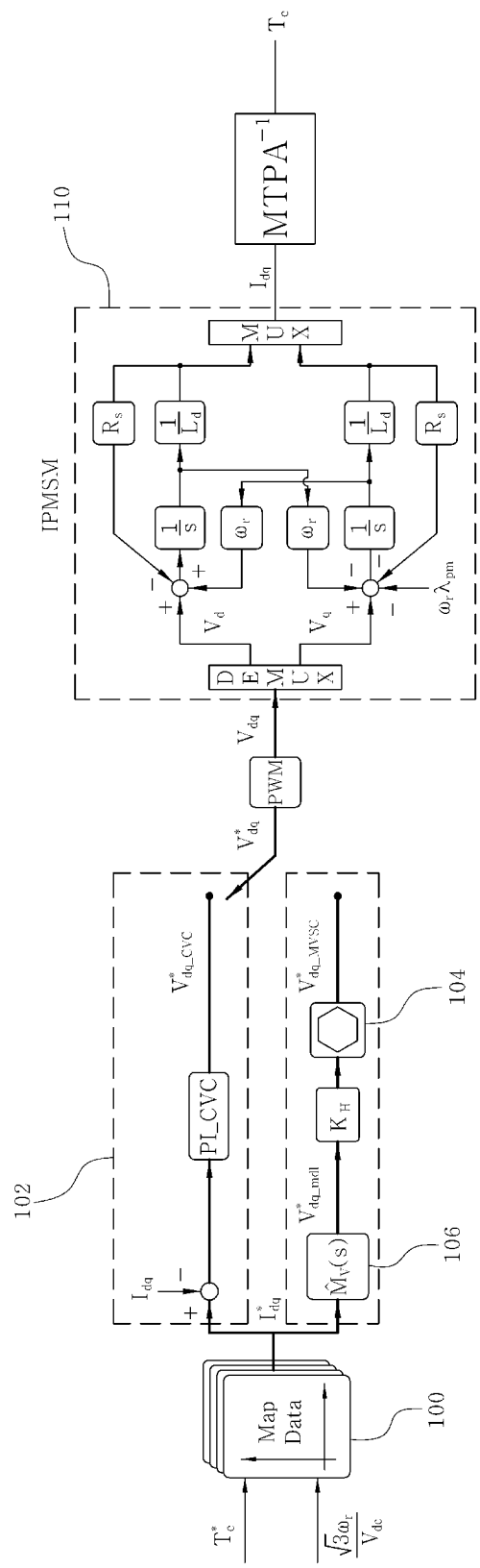
FIG. 1 is a block diagram illustrating a control method of a permanent magnet synchronous motor according to an exemplary embodiment of the present invention.
Figure 3:
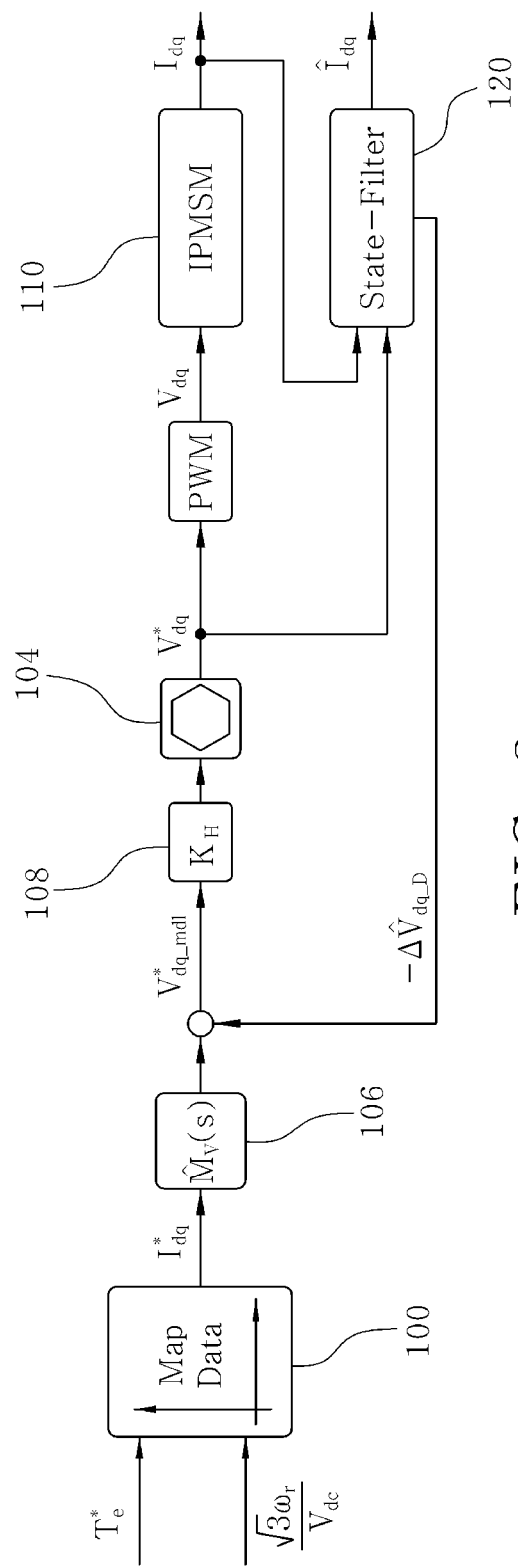
FIG. 3 is a block diagram illustrating a technique of improving voltage use and a technique of compensating a torque error in the control method of a permanent magnet synchronous motor according to the embodiment of the present invention.
Figure 4:
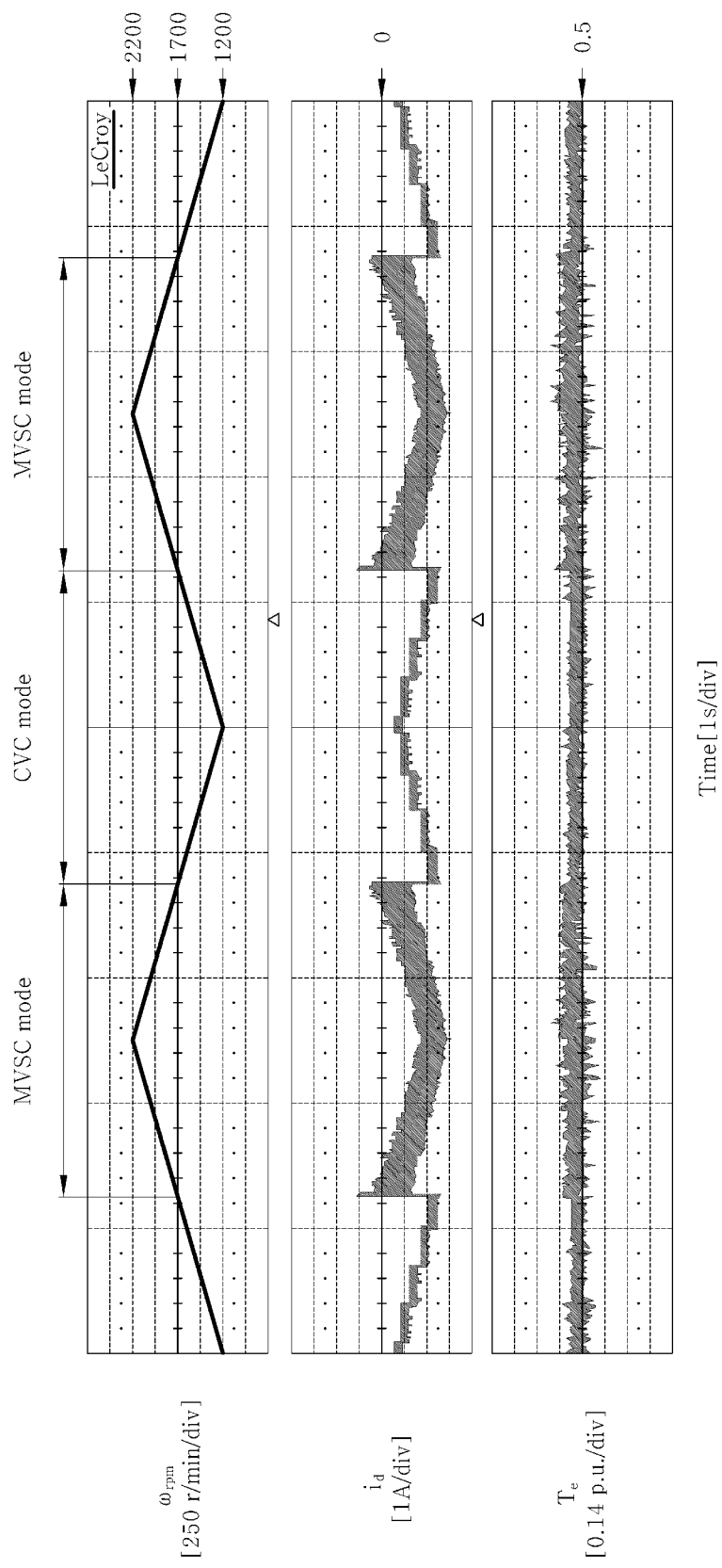
FIGS. 4 and 5 are waveform charts illustrating test of the method of controlling a permanent magnet synchronous motor according to the embodiment of the present invention.

As shown in FIG. 1 and FIG. 3, a current command Idq* is generated using a magnetic flux-based map data unit 100 having a torque command Te* and a motor speed/batter output voltage $$\frac{\sqrt{3}\,\omega_r}{V_{dc}}$$

as inputs. Then, a mode is switched to a current control mode (a mode CC) and a VPC control mode (Mode VPC) based on a constant torque area and a weak magnetic flux area of a synchronous motor.

Specifically, the current control mode is switched to a current vector control mode 102 (hereinafter, referred to as CVC control mode) in the constant torque area of the synchronous motor and a voltage phase control mode is switched to a modulating voltage scale controller mode 104 (hereinafter, referred to as a MVSC control mode) in the weak magnetic flux area.

In this case, in the MVSC control mode, an inverse model map 106 generates a voltage command Vdq* using the current command generated by the map data unit 100 and the generated voltage command is multiplied by a certain gain KH(>2) in order for a voltage generator 108 to generate a voltage limited within a hexagon.

The present invention is made to build a controller using the maximum voltage of a hybrid vehicle for the purpose of achieving power density wider than a broad operative area such that CVC type maximum torque per ampere (MTPA) control to achieve minimum copper loss under a reference speed condition and that a motor control is made by the MVSC control mode in the weak magnetic flux area of the synchronous motor.

That is, the present invention is made to provide a motor control algorithm used in a hybrid vehicle and an electric vehicle which use an interior permanent magnet synchronous motor, such that, first, voltages substantially near the maximum voltage are used by utilizing magnetic flux-based map data having the torque command and the motor speed/battery output voltage as inputs during the weak magnetic flux area driving and the MVSC control mode as the voltage phase control, and that a torque error can be compensated using a torque error compensation filter when a motor constant is changed by temperature or other factors in the weak magnetic flux area.

FIGS. 1 and 3 are block diagrams illustrating a system and method of controlling a permanent magnet synchronous motor according to an exemplary embodiment of the present invention and illustrates an example for using the complex type maximum voltage for the interior permanent magnet synchronous motor (hereinafter, referred to as IPMSM).

First, the command torque $T^*_e$ and an inverse command flux $$\frac{\sqrt{3}\,\omega_r}{V_{dc}}(=\lambda_s^{-1*})$$

are inputted to the map data unit 100 as a lookup table built for the weak magnetic flux area and the MTPA and the map data unit 100 generates a current command Idq*. In this case, the map data unit 100 performs mapping on linear voltage limit for the CVC in the CVC control mode and a feedback current $I_{dq}$ is controlled to follow a command current vector $I^*_{dq}$ by a proportional-integral (PI) current regulator. Then, a command voltage vector by the current control $v^*_{dq\_CVC}$ is transmitted to the IPMSM within the voltage limit.

On the contrary, in the MVSC control mode, the command voltage $v^*_{dq\_mdl}$ is calculated using a synchronizing reference frame-based voltage model, that is, an inverse model map 106 $\hat{M}_v(s)$ and equation thereof are expressed by the following equations 2 and 3.

$$v^*_{d\_mdl} \cong -\omega_r \hat{L}_q I^*_q$$

$$v^*_{q\_mdl} \cong \omega_r \hat{L}_d I^*_d + \omega_r \hat{\lambda}_{pm} \qquad \text{[Equation 2]}$$

Wherein $L_{dq}$ is d-q axis inductance, $\lambda_{pm}$ is a linkage flux of a permanent magnet (PM), $\omega_r$ is a rotor angular velocity, and "^" is a variable. Moreover, the command voltage $v^*_{dq\_mdl}$ is always in the range of the linear voltage limit because the command voltage $v^*_{dq\_mdl}$ is calculated from the CVC-based command current $I^*_{dq}$.

In order to improve voltage use in the weak magnetic flux area of the synchronous motor, the command voltage $v^*_{dq\_mdl}$ is multiplied by a scalar kain KH while a torque discontinuity so that the command voltage $v^*_{dq\_mdl}$ expands to the outside of the circular area inscribed to the hexagon and is regulated to a hexagonal voltage limit using minimum magnitude-error over-modulation to be outputted as the command voltage $v^*_{dq\_MVSC}$.

The command voltage $v^*_{dq\_MVSC}$ generated in the hexagonal area is used to the motor torque control in the weak magnetic flux area when the CVC is inactivated and the maximum voltage use and a voltage choice may be achieved in the weak magnetic flux area.

Figure 7:
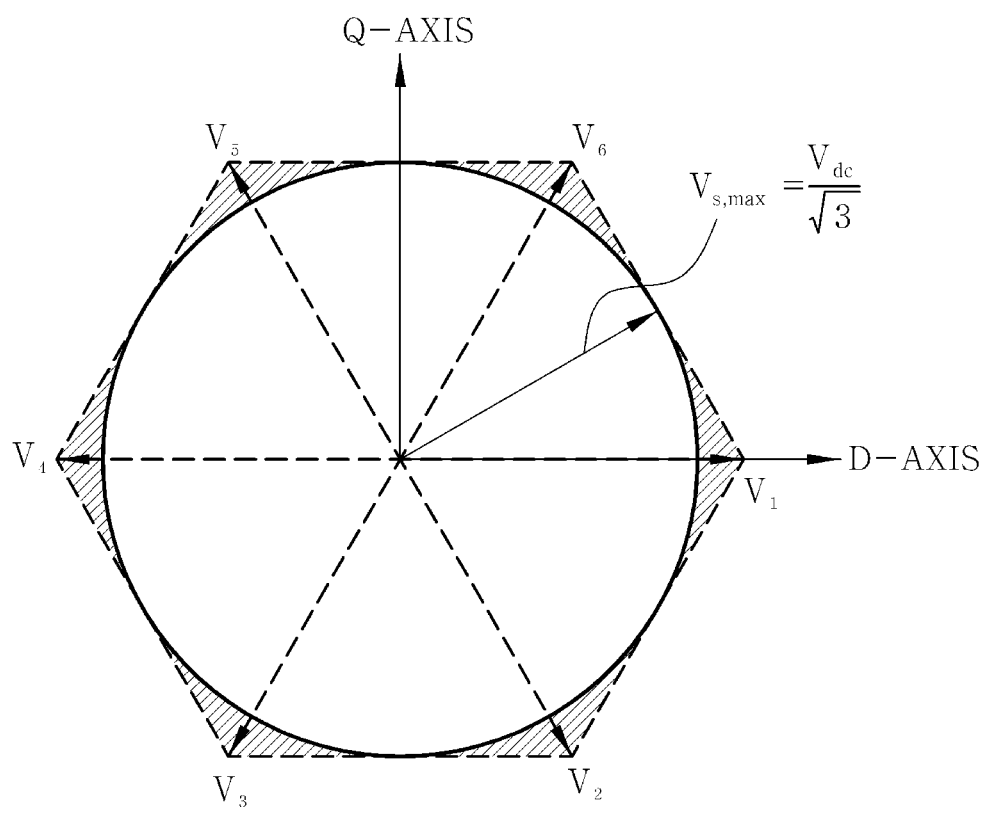

Referring to FIG. 7, since the circular area inscribed to the hexagon is an area where the linear voltage synthesis is enabled and $$v_{s,max} = \frac{v_{dc}}{\sqrt{3}}$$

indicates the maximum synthesized voltage in which the voltages can be linearly synthesized in the circular area, according to the existing control method, the voltage use decreases by about 10% than voltages in the hexagonal area because the weak magnetic reference voltage in the circular area inscribed to the hexagonal area is used.

On the contrary, in order to improve the voltage use in the weak magnetic flux area of the synchronous motor, since the control mode is switched to the MVSC control mode in the weak magnetic flux area so that the command voltage $v^*_{dq\_mdl}$ expands to the outside of the circular area inscribed to the hexagonal area and is regulated to the hexagonal voltage limit using the minimum magnitude-error over-modulation to be outputted as a command voltage $v^*_{dq\_MVSC}$, the maximum voltage use in the weak magnetic flux area is available.

In particular, a precise torque control is not carried out in the MVSC control mode because there are factors such as flux change of a PM due to high saturated humidity and temperature and because impact of a resistance error of a stator to the torque control at a high speed should be considered. To this end, a look-up table is established based on normal state measured values on a motor voltage, a motor current, dc-link voltage, a rotor speed, and an actual torque and a compensation model is established for the precise torque control when the MVSC control mode is carried out.

Figure 2:
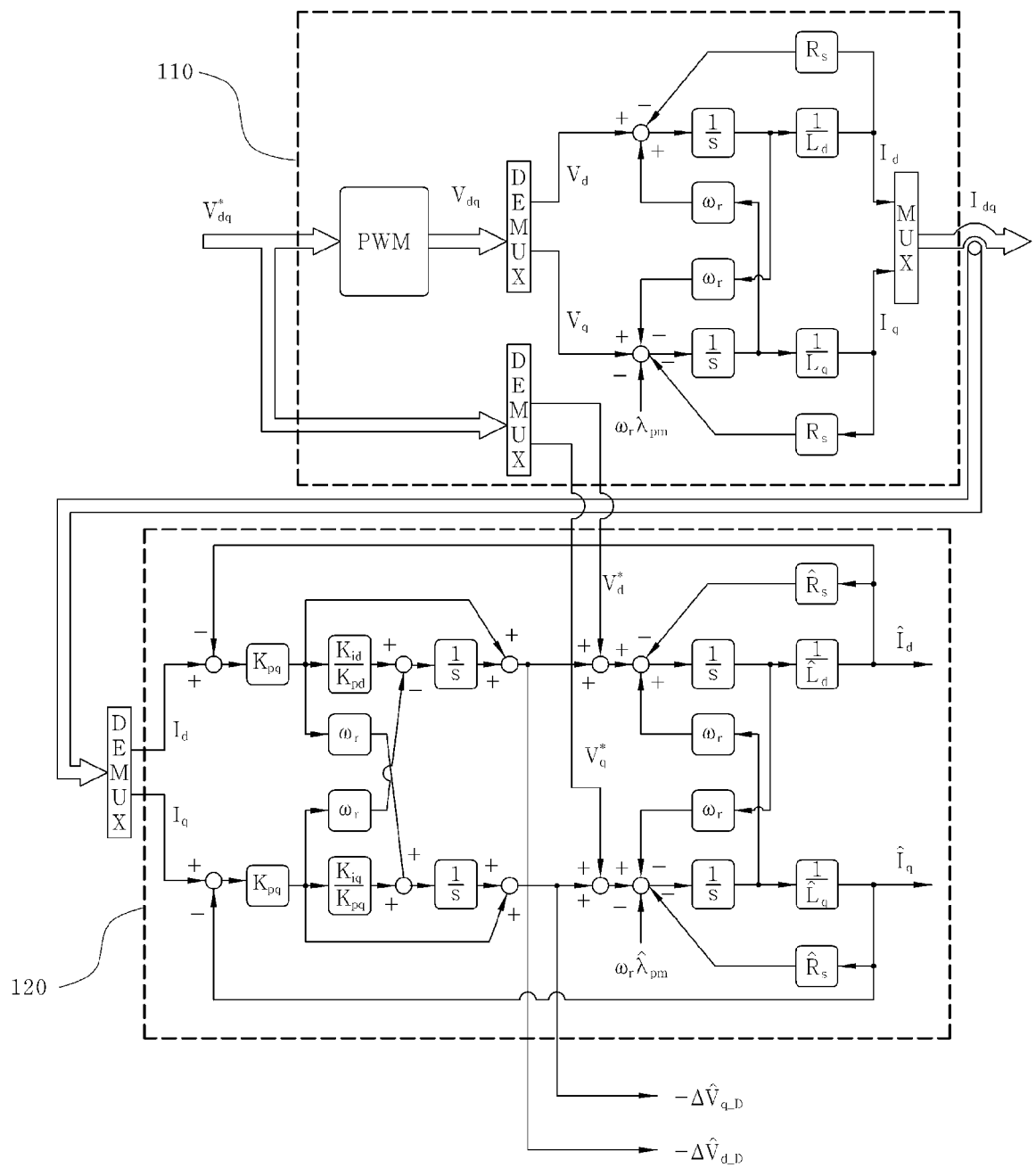
FIG. 2 is a block diagram illustrating compensation for a torque error in the control method of a permanent magnet synchronous motor according to the embodiment of the present invention.

For example, a voltage variable-based filter, that is, a torque error compensation filter 120 (called as a state-filter by inventors of this application) for compensating a torque error is built as illustrated in FIGS. 2 and 3. Specifically, an output side of the IPMSM 110 and an output side of the voltage generator 109 are connected to an input side of the torque error compensation filter 120 and an output side of the error compensation filter 120 is connected to the inverse model map 106 of the MVSC control mode 104.

The torque error compensation filter 120 outputs a voltage including a d-q axis inductance change $\Delta \hat{L}_{dq}$ at high speed of the motor and a linkage flux of the PM $\Delta \hat{L}_{pm}$ as following equation 3.

$$\Delta \hat{v}_{d\_D} \cong -\omega_r \Delta \hat{L}_q i_q$$

$$\Delta \hat{v}_{q\_D} \cong \omega_r (\Delta \hat{L}_d i_d + \Delta \hat{\lambda}_{pm}) \qquad \text{[Equation 3]}$$

wherein, $\Delta\hat{L}_{dq}$ is a d-q axis inductance change, $\Delta\hat{L}_{pm}$ is a linkage flux change, $\omega_r$ is an angular velocity of a rotor, and "^" is a variable.

The outputted d-q axis inductance change $\Delta\hat{L}_{dq}$ and the linkage flux change $\Delta\hat{\lambda}_{pm}$ are added to a voltage outputted from the inverse model map 106 such that the torque error by the inverse model map 106 is compensated in the form of a voltage.

Figure 5:
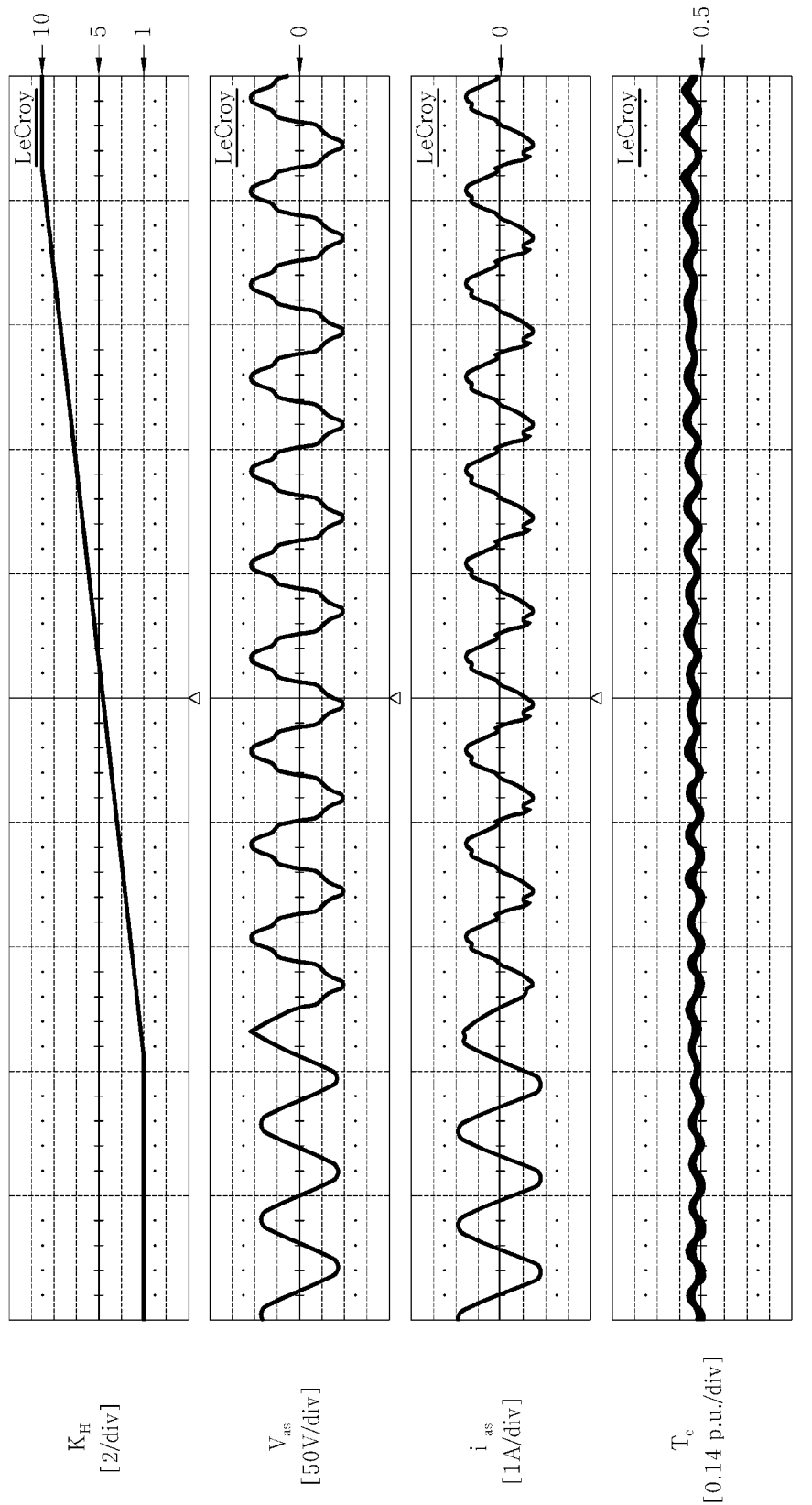

FIG. 5 illustrates results of a test for performance between the CVC control mode and the MVSC control mode of the present invention, waveforms are a rotor velocity, a d-axis current, and torque measured by a torque sensor from top to the bottom.

In the test, the d-axis current is gradually dropped down to decrease the motor linkage flux in the CVC control mode and is suddenly increased when a mode is switched because a stator voltage is increased to the hexagonal boundary in the MVSC control mode. In this case, change of the torque does not occur when the control mode is switched to the MVSC control mode and the CVC control mode and this means that the torque is controlled uniform even under the condition where a motor parameter is changed by the torque compensation of the torque error compensation filter 120.

Figure 6:
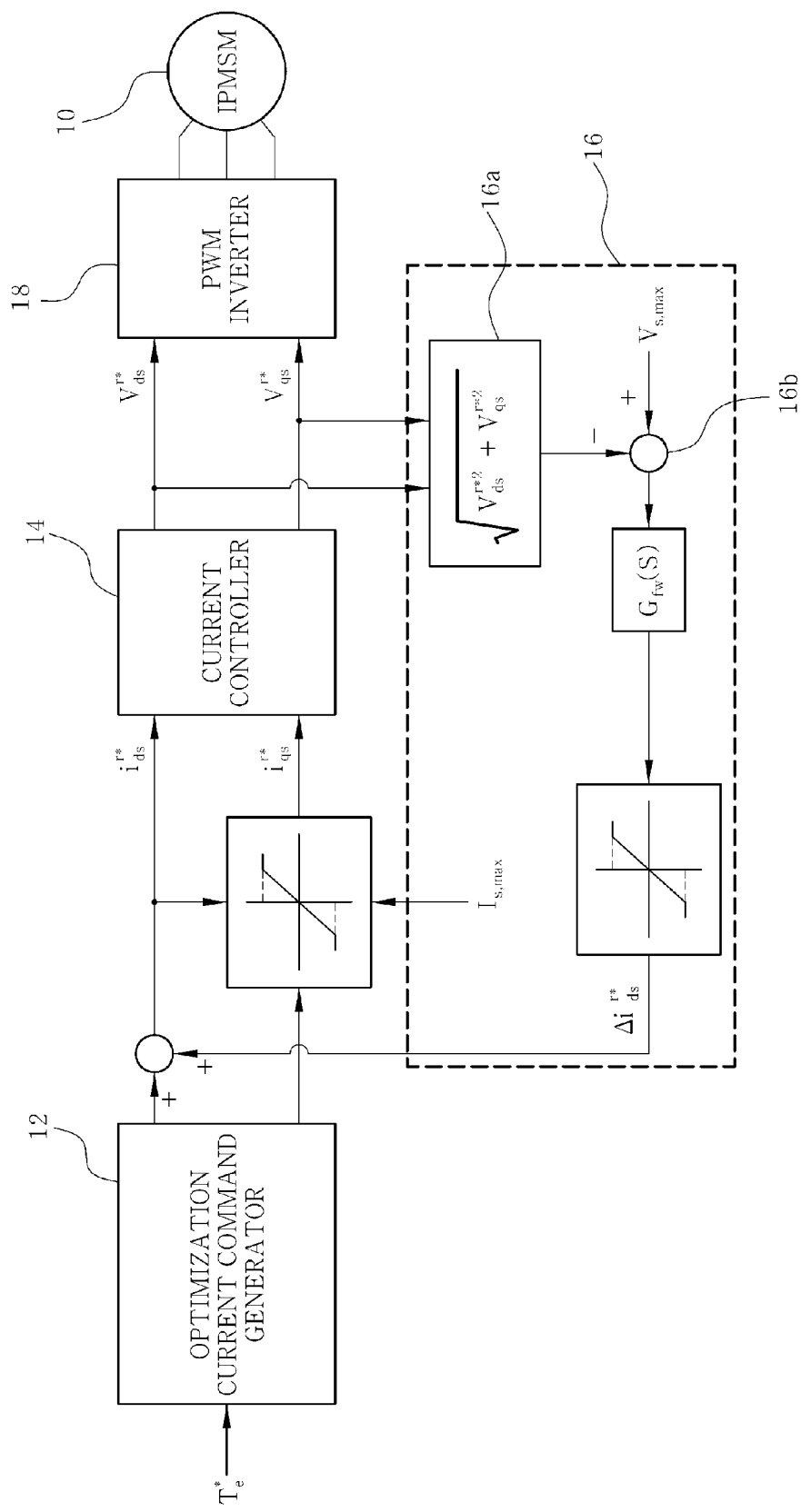
FIGS. 6 and 7 are schematic views illustrating an existing method of controlling an interior permanent magnet synchronous motor.

FIG. 6 illustrates results of a test related to the illustrative embodiment of the present invention showing a rotor velocity $\omega_r$ measured by varying the rotor angular velocity from 0 to 2200 r/min, a d-axis current, a q-axis current, and a stator current, wherein (a) indicates the CVC control mode and (b) indicates the MVSC control mode.

Magnitude of the d-axis current in the MVSC control mode is small because the maximum voltage is used while the q-axis current is substantially same to that of the CVC control mode, and consequently the stator current can be reduced by about 33% in the MVSC control mode than the CVC control mode. These results mean that power density of the inventor can be improved without an integrator of the PI type current controller and the control such as complex gain regulation for six stage modulation and the dc-bus voltage can be maximized While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of controlling a permanent magnet synchronous motor to use a command voltage ($v^*_{dq\_MVSC}$) outputted from an modulating voltage scale controller (MVSC) control mode in a motor torque control in a weak magnetic flux area comprising:

generating, by a controller, a current command ($I^*_{dq}$) using a magnetic flux-based map data unit having a torque command ($T^*_e$) and a motor speed/battery output voltage $$\left(\frac{\sqrt{3}\,\omega_r}{V_{dc}}\right)$$

as inputs; and switching, by the controller, to a current vector control (CVC) control mode as a current control mode in a constant torque area of a synchronous motor or to the MVSC control mode as a voltage phase control mode in the weak magnetic flux area of the synchronous motor, wherein the MVSC control mode comprises:

calculating a command voltage ($V^*_{dq\_mdl}$) by an inverse model map, $\hat{M}_v(s)$; and multiplying a scalar gain (KH) to the command voltage ($V^*_{dq\_mdl}$) such that the command voltage ($V^*_{dq\_mdl}$) is regulated into a hexagonal voltage limit and is outputted as the command voltage ($v^*_{dq\_MVSC}$).

2. The method as claimed in claim 1, wherein in the CVC control mode, a feedback current ($I_{dq}$) is controlled to follow a command current vector ($I^*_{dq}$) by a current regulator and a command voltage vector ($*v_{dq\_CVC}$) by the current control is transmitted to an interior permanent magnet synchronous motor (IPMSM) within a voltage limit.

3. The method as claimed in claim 1, wherein the command voltage ($v^*_{dq\_mdl}$) is calculated by the inverse model map, $\hat{M}_v(s)$ as the following equation, $$v^*_{d\_mdl} \cong -\omega_r \hat{L}_q I^*_q$$

$$v^*_{d\_mdl} \cong \omega_r \hat{L}_q I^*_q + \omega_r \hat{\lambda}_{pm}$$

wherein Ldq is a d-q axis inductance, $\lambda_{pm}$ is linkage flux of a permanent magnet (PM), $\omega_r$ is an angular velocity of a rotor, and ^ is a variable.

4. The method as claimed in claim 1, further comprising:

a receiving, by a torque error compensation filter, a current output from an IPMSM and a voltage output from a voltage generator to output a torque error compensation voltage as following equation; and $$\Delta\hat{v}_{d\_D} \cong -\omega_r \Delta\hat{L}_q I_q$$

$$\Delta\hat{v}_{d\_D} \cong \omega_r(\Delta\hat{L}_q i_q + \Delta\hat{\lambda}_{pm})$$

adding the torque compensation voltage to a voltage outputted from an inverse model map such that a torque error by the inverse model map is compensated in the form of a voltage, wherein $\Delta\hat{L}_{dq}$ is a d-q axis inductance change, $\Delta\hat{\lambda}_{pm}$ is linkage flux change, and $\omega_r$ is a rotor angular velocity, and ^ is a variable.

5. A non-transitory computer readable medium containing program instructions executed by a controller for controlling a permanent magnet synchronous motor to use a command voltage ($v^*_{dq\_MVSC}$) outputted from an modulating voltage scale controller (MVSC) control mode in a motor torque control in a weak magnetic flux area, the computer readable medium comprising:

program instructions that generate a current command ($I^*_{dq}$) using a magnetic flux-based map data unit having a torque command ($T^*_e$) and a motor speed/battery output voltage $$\left(\frac{\sqrt{3}\,\omega_r}{V_{dc}}\right)$$

as inputs; and program instructions that switch to a current vector control (CVC) control mode as a current control mode in a constant torque area of a synchronous motor or to the MVSC control mode as a voltage phase control mode in the weak magnetic flux area of the synchronous motor, wherein the MVSC control mode comprises:

program instructions that calculate a command voltage ($V^*_{dq\_mdl}$) by an inverse model map, $\hat{M}_v(s)$; and program instructions that multiply a scalar gain (KH) to the command voltage ($V^*_{dq\_mdl}$) such that the command voltage ($V^*_{dq\_mdl}$) is regulated into a hexagonal voltage limit and is outputted as the command voltage ($v^*_{dq\_MVSC}$).

6. The non-transitory computer readable medium as claimed in claim 5, wherein in the CVC control mode, a feedback current ($I_{dq}$) is controlled to follow a command current vector ($I^*_{dq}$) by a current regulator and a command voltage vector ($v^*_{dq\_CVC}$) by the current control is transmitted to an interior permanent magnet synchronous motor (IPMSM) within a voltage limit.

7. The non-transitory computer readable medium as claimed in claim 5, wherein the command voltage ($v^*_{dq\_mdl}$) is calculated by the inverse model map, $\hat{M}_v(s)$) as the following equation, $$v^*_{d\_mdl} \cong -\omega_r \hat{L}_q I^*_q$$

$$v^*_{d\_mdl} \cong \omega_r \hat{L}_q I^*_q + \omega_r \hat{\lambda}_{pm}$$

wherein Ldq is a d-q axis inductance, $\lambda_{pm}$ is linkage flux of a permanent magnet (PM), $\omega_r$ is an angular velocity of a rotor, and ˆ is a variable.

8. The non-transitory computer readable medium as claimed in claim 5, further comprising:

program instructions that utilize a current output from an IPMSM and a voltage output from a voltage generator to output a torque error compensation voltage as following equation; and $$\Delta \hat{v}_{d\_D} \cong -\omega_r \Delta \hat{L}_q I_q$$

$$\Delta \hat{v}_{d\_D} \cong \omega_r (\Delta \hat{L}_q i_q + \Delta \hat{\lambda}_{pm})$$

program instructions that add the torque compensation voltage to a voltage outputted from an inverse model map such that a torque error by the inverse model map is compensated in the form of a voltage, wherein $\Delta \hat{L}_{dq}$ is a d-q axis inductance change, $\Delta \hat{\lambda}_{pm}$ is linkage flux change, and $\omega_r$ is a rotor angular velocity, and ˆ is a variable.

* * * * *